United States Patent
Nelson et al.

(10) Patent No.: US 6,537,507 B2
(45) Date of Patent: Mar. 25, 2003

(54) NON-THERMAL PLASMA REACTOR DESIGN AND SINGLE STRUCTURAL DIELECTRIC BARRIER

(75) Inventors: David Emil Nelson, Independence Township, MI (US); Bob Xiaobin Li, Grand Blanc, MI (US); Mark David Hemingway, Columbiaville, MI (US); Darrell R. Herling, Kennewick, WA (US); Suresh Baskaran, Kennewick, WA (US)

(73) Assignee: Delphi Technologies, Inc., Troy, MI (US)

( * ) Notice: Subject to any disclaimer, the term of this patent is extended or adjusted under 35 U.S.C. 154(b) by 83 days.

(21) Appl. No.: 09/741,764

(22) Filed: Dec. 19, 2000

(65) Prior Publication Data

US 2002/0028163 A1 Mar. 7, 2002

Related U.S. Application Data

(63) Continuation-in-part of application No. 09/511,590, filed on Feb. 23, 2000, now Pat. No. 6,338,827.

(51) Int. Cl.[7] ................................................ B01J 19/08
(52) U.S. Cl. ................... 422/186; 422/186.04; 422/121
(58) Field of Search .......................... 422/186, 186.04, 422/121; 60/275; 95/3; 96/19, 80

(56) References Cited

U.S. PATENT DOCUMENTS

| | | | | |
|---|---|---|---|---|
| 4,842,829 A | * | 6/1989 | Hirai et al. ................. | 250/435 |
| 6,245,299 B1 | * | 6/2001 | Shiloh et al. ................ | 422/121 |
| 6,395,238 B1 | * | 5/2002 | Rogers et al. ......... | 422/186.04 |

\* cited by examiner

Primary Examiner—Nam Nguyen
Assistant Examiner—Wesley A. Nicolas
(74) Attorney, Agent, or Firm—Vincent A. Cichosz (57) ABSTRACT

A non-thermal plasma reactor element is provided comprising a multi-cell stack prepared from a plurality of formed building blocks of dielectric material, the walls of the building blocks defining a cell having an exhaust passage for flowing gas to be treated therethrough. A conductive print forming an electrode and connector is disposed on at least one wall of each of the cells and outer insulative plates, disposed on opposite ends of the multi-cell stack, are provided to protect the conductive print. The non-thermal plasma reactor element includes cells defined by a single structural dielectric barrier comprising a "conductor-single structural dielectric barrier-exhaust passage-conductor" arrangement, wherein individual cells of the reactor element are defined by a single structural dielectric barrier.

16 Claims, 8 Drawing Sheets

NON-THERMAL PLASMA REACTOR DESIGN AND SINGLE STRUCTURAL DIELECTRIC BARRIER

CROSS-REFERENCE TO RELATED APPLICATIONS

The present application is a continuation-in-part of U.S. patent application Ser. No. 09/511,590 entitled "Design And Method Of Manufacturing A Plasma Reactor For Treating Auto Emissions—Stacked Shapes," filed on Feb. 23, 2000 and now U.S. Pat. No. 6,338,827 which is hereby incorporated by reference herein in its entirety.

TECHNICAL FIELD

This invention relates to reactors for chemical reduction of nitrogen oxide (NOx) emissions in the exhaust gases of automotive engines, particularly diesel and other engines operating with lean air fuel mixtures that produce relatively high emission of NOx, and method of manufacturing same. More particularly, the invention pertains to an improved stacked shape nonthermal plasma reactor and system for use with diesel engines and the like.

BACKGROUND OF THE INVENTION

In recent years, non-thermal plasma generated in a packed bed reactor has been shown to be effective in reducing nitric oxides (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz.

An outside or ground electrode is formed by a coating of metal in various forms, including tape, flame spray, mesh, etc. The space between the center electrode and the inside diameter of the dielectric tube is filled with small diameter glass beads. When high voltage alternating current is applied to the center electrode, the surfaces of the beads go into corona, producing a highly reactive and selective surface for inducing the desired reaction in the gas.

Unfortunately, the packed bed design with its loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A reactor for use with diesel engines and other engines operating with lean air fuel mixtures is disclosed in commonly assigned U.S. patent application Ser. No. 09/465,073 entitled "Non-thermal Plasma Exhaust NOx Reactor", now U.S. Pat. No. 6,464,945 which is hereby incorporated by reference herein in its entirety. Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates and are coated in a pattern that establishes a separation between the electrodes and the connectors of alternate electrodes suitable to prevent voltage leakage. Conductive ink is sandwiched between two thin nonporous alumina plates or other suitable insulating plates to prevent arcing while providing a stable electrode spacing for a uniform electric field.

There remains a need for an improved non-thermal plasma reactor and an improved method of preparing same which lowers overall cost by reducing manufacturing complexity, the number of components and provides design and manufacturing flexibility. There further remains a need for an improved non-thermal plasma reactor and method that provides reduced manufacturing costs and complexity over improved double dielectric barrier "sandwich" designs comprising dielectric barrier-conductive material-dielectric barrier-exhaust passage repeating arrangements.

SUMMARY OF THE INVENTION

The present invention provides a non-thermal plasma reactor and method of preparing same. The non-thermal plasma reactor element is prepared from a formed shape of dielectric material used as a building block for creating the region of the non-thermal plasma reactor wherein plasma is generated. The formed shape defines an internal cell in the plasma reactor having an exhaust passage for flowing exhaust gas to be treated therethrough. In one embodiment, the formed shape comprises a full cell. In an alternate embodiment, the formed shape comprises a half-cell that is assembled together with a second half-cell to form a full cell.

Individual cells are provided with a conductive print disposed thereon to form electrodes and connectors. In a preferred embodiment, the conductive print comprises a continuous grid pattern having a cutout region disposed opposite the terminal connector for reducing potential voltage leaks. The cutout region provides a distance between the connector and the electrode of adjacent cells sufficient to prevent arc over without diminishing performance. In yet another preferred embodiment, the conductive print is extended over the edge of the cell to provide a site for electrical connection along the side of each cell.

Multiple formed cells are stacked and connected together to form the present multi-cell stack. The upper, outermost cell in the stack is provided with a conductive print on the top and bottom walls. The remainder of the cells in the multi-cell stack have conductive print disposed only on one wall. In a preferred embodiment, the cells are connected with glass glue. Outer plates are provided to insulate the conductive print from the non-thermal plasma reactor housing and to generally protect the conductive print.

The present invention also provides a simple, low cost method for preparing a non-thermal plasma reactor comprising forming, preferably by extruding, a plurality of building block shapes for processing into cells, printing a conductive print onto individual formed cells, assembling the individual cells into a multi-cell stack, preparing electrical connections, applying insulation; and inserting the assembly into the non-thermal plasma reactor housing.

In the half-cell embodiment, the method preferably comprises printing an additional adhesive onto the rails of one of the building blocks for each cell. In a preferred embodiment, the half-cell embodiment employs roll compaction fabrication. In yet another preferred embodiment, the method comprises disposing a catalytic coating on one or both faces of the half-cells.

The present non-thermal plasma reactor is particularly useful for reducing NO, NOx, and particulate constituents in automotive applications. The present reactor and method of preparing same provides the advantages of low cost and durability compared to currently available wire, tubular, or stacked plate designs. The simplified design reduces manufacturing complexity as well as number of components, therefore reducing overall cost. By eliminating the need for spacers between individual cells, the present design and method thus further reduces the total number of components and material cost. In the full cell embodiment, the number of stack components in the stack is reduced by about 80% over prior designs using spacers. In the half-cell embodiment, the number of stack components in the stack is reduced by about 57% over prior designs using spacers.

The present method using formed shapes as building blocks provides flexibility and may be used in conjunction with conventional processing methods. The printing sequence is defined from the top of the multi-cell stack to the bottom, further minimizing the number of components. Use of three-dimensional conductive print simplifies the preparation by eliminating the need for a secondary conductive print along the edge of the multi-cell stack after assembly.

The present invention further provides a non-thermal plasma reactor and method comprising a single structural dielectric barrier. The reactor element includes cells defined by a single structural dielectric barrier comprising a "conductor-single structural dielectric barrier-exhaust passage-conductor" arrangement, wherein individual cells of the reactor element are defined by a single structural dielectric barrier rather than a double dielectric barrier.

The conductor may comprise conductive coatings disposed on the single structural dielectric barrier, conductive plates or conductive tubes. Conductors disposed on each side of the exhaust passage are connected to power and ground. When the reactor element is powered with high voltage alternating current, a non-thermal plasma is formed in the exhaust passage for treating constituents present in the exhaust stream passing through the exhaust passage.

The single structural dielectric barrier NTP reactors herein may include cells having any desired shape, including, planar shapes, cylindrical and swept shapes. Examples of suitable single structural dielectric barrier configurations include, but are not limited to, plates, half-box shapes, C-shapes, and tubes.

Advantageously, the present single structural dielectric barrier NTP reactors provide lower manufacturing and material costs over NTP reactors employing double dielectric barrier designs. The present single structural dielectric barrier NTP reactors provide simplified fabrication and reduced material costs due to the elimination of a dielectric barrier for each cell of the NTP reactor element. For example, a C-shaped (planar) single structural dielectric barrier NTP reactor having an element including C-shaped cells uses 50% fewer C-shapes than a comparable double dielectric barrier NTP reactor.

Advantageously, the present single structural dielectric barrier NTP reactors provide similar performance to higher cost double dielectric barrier NTP reactors. At space velocities less than 50,000 inverse hours, single structural dielectric barrier NTP reactors provide equivalent conversion efficiency compared to double dielectric barrier NTP reactors.

Advantageously, the present planar and cylindrical single structural dielectric barrier NTP reactors are prepared using a simplified attachment method that further reduces manufacturing complexity and assembly costs.

In one embodiment, the present single structural dielectric barrier NTP reactors advantageously provide end supports that enable elimination of performance limiting ligaments within the active area of the NTP reactor.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figure 1:
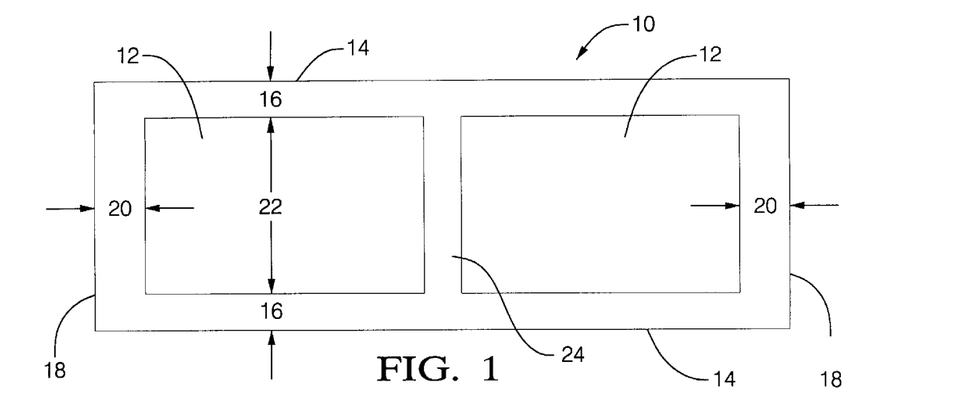
FIG. 1 is a cross-sectional view of an embodiment of the present invention of a formed shape used as a building block for the region of the nonthermal plasma reactor wherein the plasma is generated.

Referring to FIG. 1 of the drawings in detail, in the present reactor and method of preparing same, a formed shape 10 is used as a full cell building block for forming the region of the non-thermal plasma reactor wherein plasma is generated. After processing, the formed shape 10 defines an internal cell in the plasma reactor having an exhaust passage 12. The material used to form shape 10 may be any material having a high dielectric constant, including, but not limited to, cordierite, titania, alumina, steatite, mullite, plastics, or a combination thereof. Preferably, the dielectric material comprises cordierite or alumina. Forming may be by any method, including, but not limited to, forming by extruding.

The single dielectric barrier wall 14 of cell 10 preferably comprises a thickness 16 from about 0.3 to about 0.8 millimeters. Sidewalls 18 form dielectric barriers for preventing voltage leaks to the outside. Sidewalls 18 preferably comprise a thickness 20 of about 10 to about 20 millimeters.

The height 22 of the exhaust passage 12 may be selected in accordance with voltage requirements and power supply capabilities. In the embodiment of FIG. 1, the height 22 of the exhaust passage 12 is about 1 to about 2 millimeters.

If desired, structural ligament 24 may be provided to support the exhaust passage 12. The structural ligament 24 is formed as part of the dielectric building block shape, thus providing easy, low complexity manufacturing.

Figure 2A:
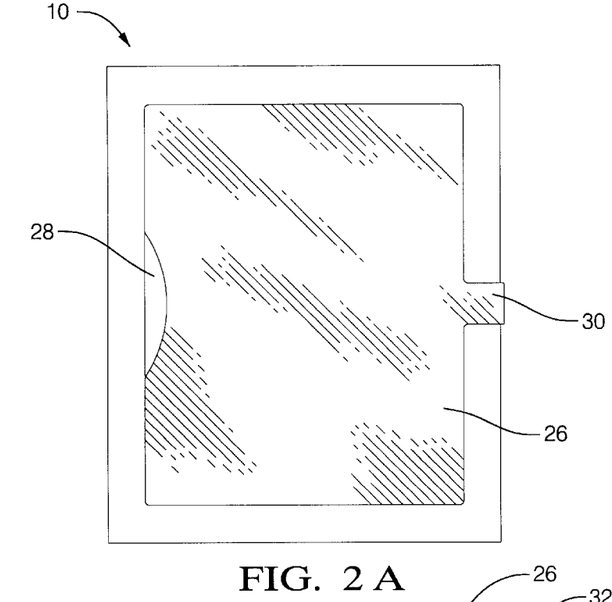
FIGS. 2A and 2B are views of the embodiment of FIG. 1, with FIG. 2A providing a cross-sectional view of the conductor print for the individual cells forming the non-thermal plasma reactor and FIG. 2B showing the conductor print rolled over the edge of the cells.
Figure 2B:
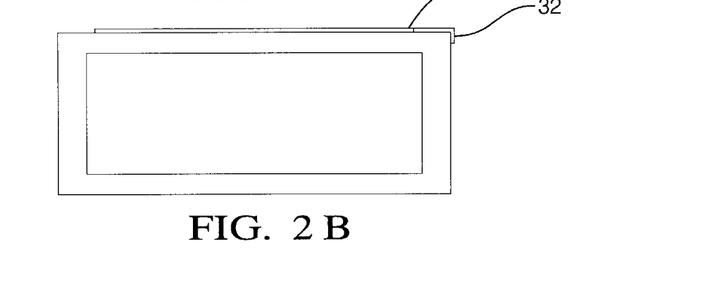

As shown in FIG. 2A, individual cells 10 each have a conductive print 26 disposed thereon. When too short a distance is provided between the electrode of one cell and the connector of another cell in a multi-cell stack, a potential failure condition is presented where high voltage could leak away from the reactor. Preferably, the conductive print 26 is patterned to form electrodes so as to provide a distance between the connector and the electrode of adjacent cells sufficient to prevent arc over without diminishing performance. Preferably, conductive print 26 comprises a continuous grid pattern having a cutout region 28 disposed opposite terminal connector 30 for reducing potential voltage leaks. In another preferred embodiment, shown in FIG. 2B, the conductive print 26 is extended over the cell edge 32 to provide a site for electrical connection along the side of each cell 10.

Figure 3:
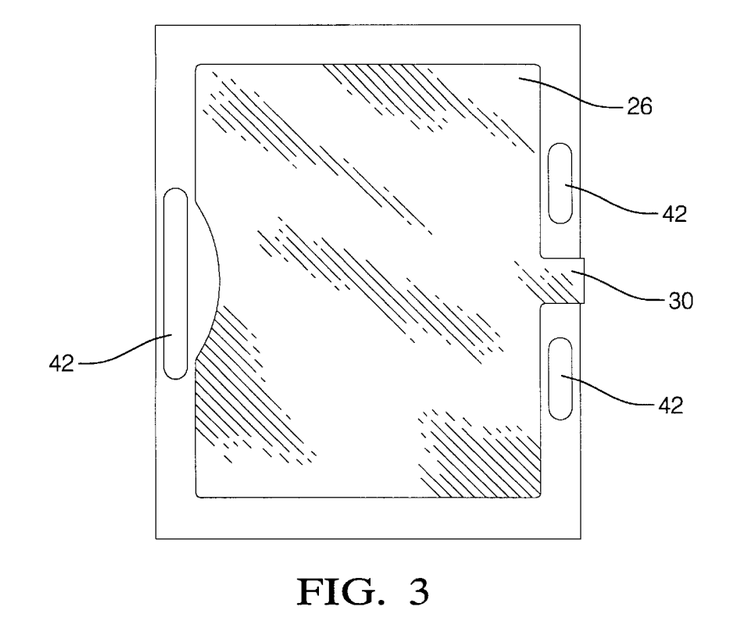
FIG. 3 is a cross-sectional view of an embodiment of the present invention using glass glue to connect the multiple cells of the non-thermal plasma reactor.
Figure 4:
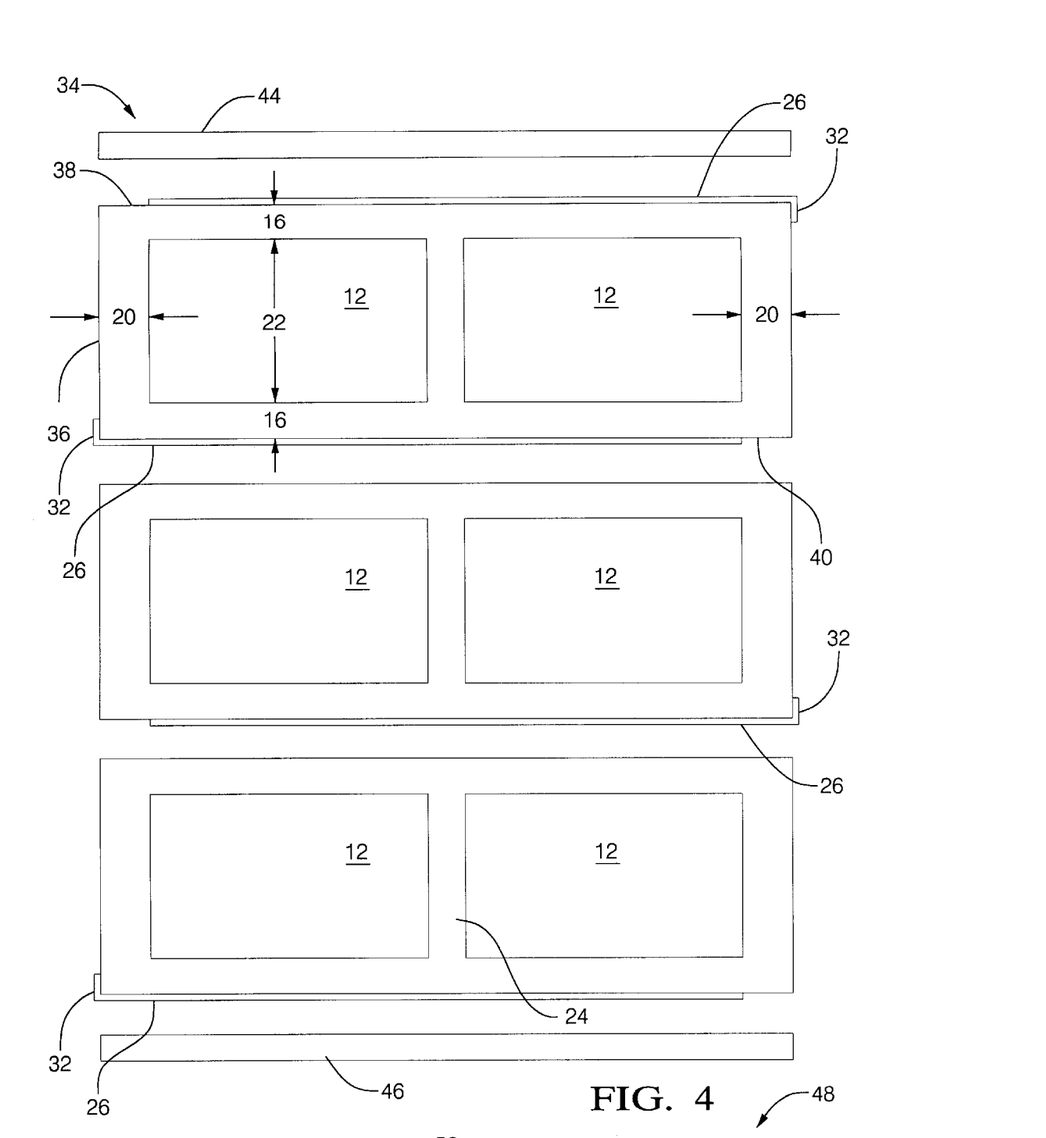
FIG. 4 is a view of a multi-cell stack.
Figure 7:
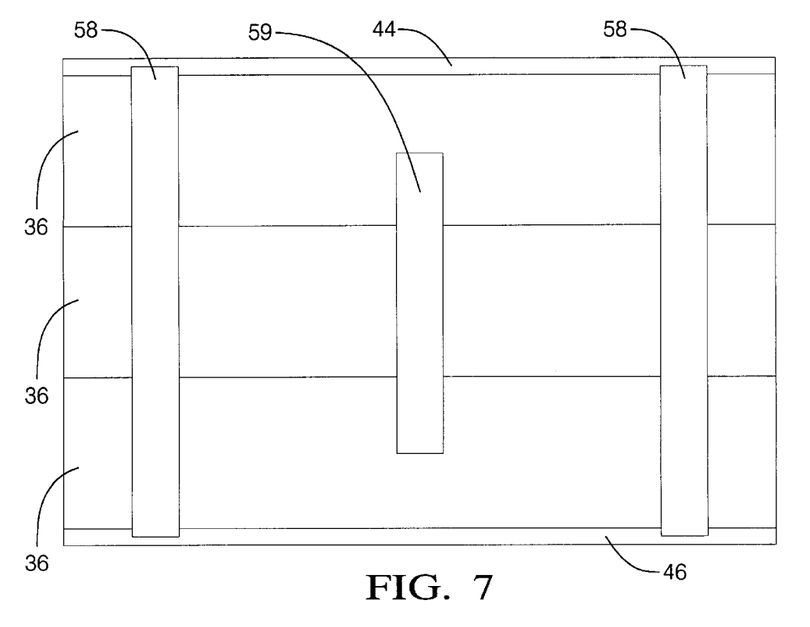
FIG. 7 is a side view of an embodiment of the present invention using adhesive applied to the assembled stack for securing the cells.

Multiple formed cells 10 combine to create the present multi-cell stack 34 as shown in FIG. 4. The upper, outermost cell 36 has a conductive print 26 on the top 38 and bottom 40 walls of the cell 10. The remainder of the cells 10 in the multi-cell stack 34 have conductive print 26 disposed only on one wall. Alternatively, both top and bottom walls of these cells may be coated so as to provide intimate contact between the conductive print 26 and each cell wall. Cells 10 within the multi-cell stack 34 are connected together. Preferably, the cells 10 are connected to one another via glass glue diffused at various locations into the dielectric material forming the cell 10. Typical glass glue print locations 42 are shown in FIG. 3. The glass glue 42 forms a robust bond securing the cells and further acts as an insulator. In an alternate embodiment, the cells 10 are held together via collars (not shown) provided so as to hold multiple cells in compression with one another while at the same time permitting some lateral movement between the cells 10. In yet another embodiment, as shown in FIG. 7, an adhesive 58, such as glass glue, forms a side attachment for holding the multi-cell stack 34 together (with numeral 59 indicating bus connection). The method comprises assembling the multi-cell stack 34, compressing the stack 34 into position, and applying an adhesive 58 to edges of the multi-cell stack 34. Typically, two strips of adhesive 58 are provided on each side of the stack 34, extending from outer plates 44, 46 and covering interior end faces.

Outer plates 44 and 46 are provided to insulate electrodes formed by the conductive print 26 from the non-thermal plasma reactor housing (not shown) and to generally protect the electrodes.

Electrical connections may be provided via a metallic strip soldered or welded, for example, to each terminal in the multi-cell stack 34. Alternatively, electrical contact between the terminals in the multi-cell stack 34 and the power supply may be achieved using a compression force on a common bus bar type terminal to hold the bus bar against the terminals. A single compression mechanism is contemplated for electrical connections on each side of the multi-cell stack 34. A non-thermal plasma reactor containing the present reactor element may include a high temperature housing surrounding said reactor element, an insulated conductor connected with said cells for connecting first electrodes to an alternating voltage source; a grounded conductor connected with second electrodes of said cells for connecting said second electrodes to ground; and means for directing exhaust gas to be treated through exhaust passages of said cells.

Figure 5:
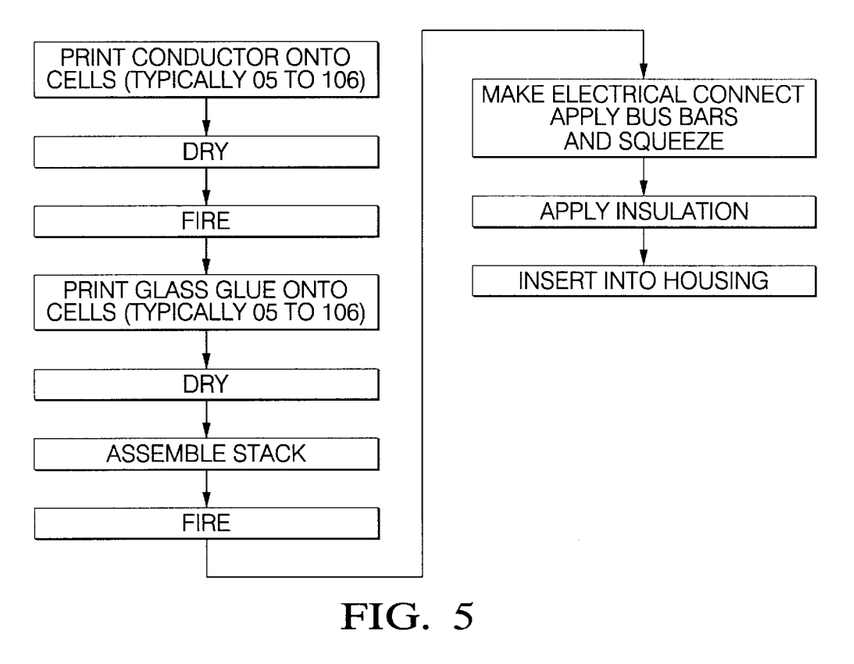
FIG. 5 is a schematic showing a flow diagram of the present method.

As illustrated in FIG. 5, the present invention provides a simplified method of low complexity for preparing a stacked shape non-thermal plasma reactor. The small number of parts further contributes to the reduction of the overall cost of manufacturing. The simplified schematic shown in FIG. 5 provides the steps of 1) printing the conductive print 26 onto the individual cells 10 (typically from about 5 to about 100 cells); 2) drying; 3) firing; 4) printing the glass glue 42 onto the individual cells 10; 5) drying; 6) assembling the individual cells 10 into a multi-cell stack 34; 7) firing; 8) preparing electrical connections, applying bus bars, and compressing same; 9) applying insulation; and 10) inserting the assembly into the non-thermal plasma reactor housing. Conventional procedures known in the art may be employed for printing, firing, drying, etc.

Figure 6:
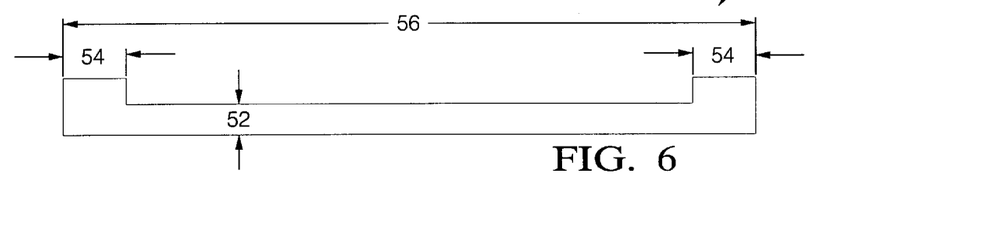
FIG. 6 is a view of an alternate embodiment for the individual cell building block of the present invention.

In another embodiment, shown in FIG. 6, a half-cell building block 48 may be used to prepare the present multi-stack plasma reactor element. Building block 48 comprises a half-cell height 50, dielectric barrier wall thickness 52, dielectric sidewall thickness 54, and cell width 56. In this embodiment, two building blocks 48, 48 are assembled, one inverted on the top of the other, to achieve the formed shape of cell 10 of the embodiment of FIG. 1. Preferably, the embodiment of FIG. 6 is prepared using roll compaction fabrication. This provides the advantages of low cost and dimensionally precise part production. Alternatively, convention fabrication methods known in the art may also be employed. These methods include, but are not limited to, tape casting or roll compaction of flat sheets and assembly into the desired building block shape by laminating, grinding, pressing, co-firing, gluing, brazing, or other means.

An additional advantage to the embodiment of FIG. 6 is the resultant "open" face provided on each building block piece, allowing for a catalytic coating to be printed on one or both faces, if desired.

Optionally, additional rails may be added to provide increased support. For example, an optional structural ligament such as the structural ligament 24 shown in the embodiment of FIG. 1 may be provided.

The method for preparing the embodiment of FIG. 6 is similar to the method provided in FIG. 5. Additional steps include printing an additional adhesive, such as glass, onto the rails of one of the building blocks 48, 48 for each cell to provide bonding of all layers when the multi-cell stack 34 is assembled from the pairs of building blocks 48, 48.

Figure 8:
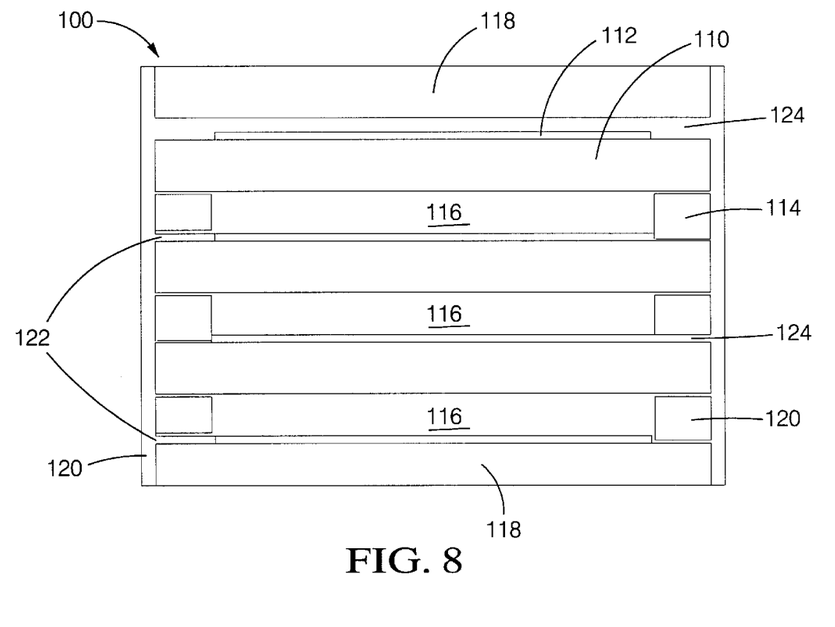
FIG. 8 is a view of a planar multi-cell NTP reactor element comprising single structural dielectric barrier plates in accordance with one embodiment of the present invention.

Referring now to FIGS. 8 through 16, embodiments of the present non-thermal plasma reactor and method comprising a single structural dielectric barrier are described. FIG. 8 depicts a planar single structural dielectric barrier NTP reactor element 100 in accordance with one possible embodiment of the single dielectric barrier aspect of the present invention. The planar NTP reactor element 100 comprises a plurality of stacked single structural dielectric barrier plates 110 having conductive material 112 disposed thereon. The conductive material 112 may be printed in a solid, partial print, or grid pattern on one side of the single dielectric barrier plate 110. Spacers 114 are disposed at opposite ends of the plates 110 as required to provide the desired height for exhaust passages 116. Cover plates 118 are provided on the top and bottom ends of the reactor element 100. An optional insulating coating 120 may be provided along reactor sides, if desired. Ground and power bus connections 122, 124, respectively, are provided to ground and high voltage power source (not shown).

Figure 9:
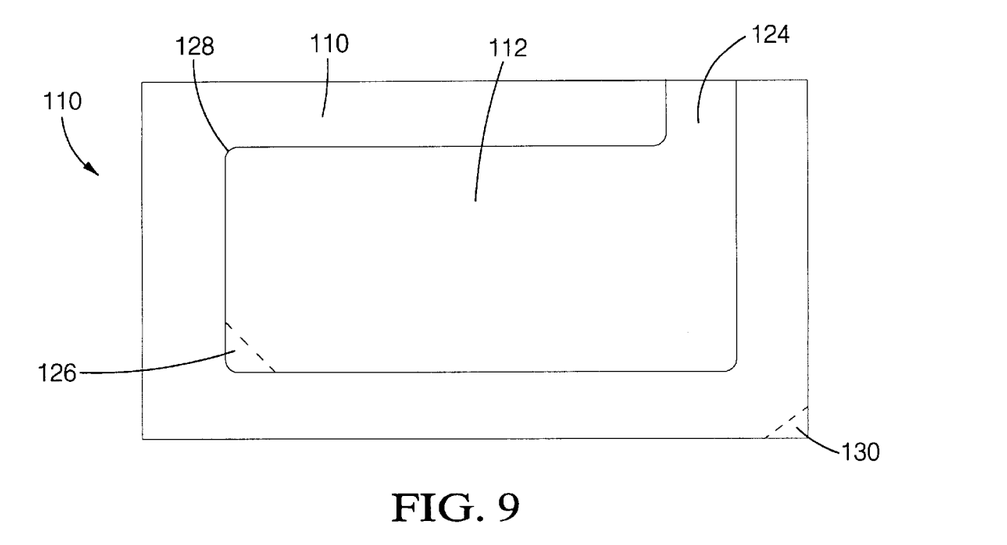
FIG. 9 is a view of the single structural dielectric barrier plate of FIG. 8. showing a preferred conductive print pattern disposed thereon.
Figure 10:
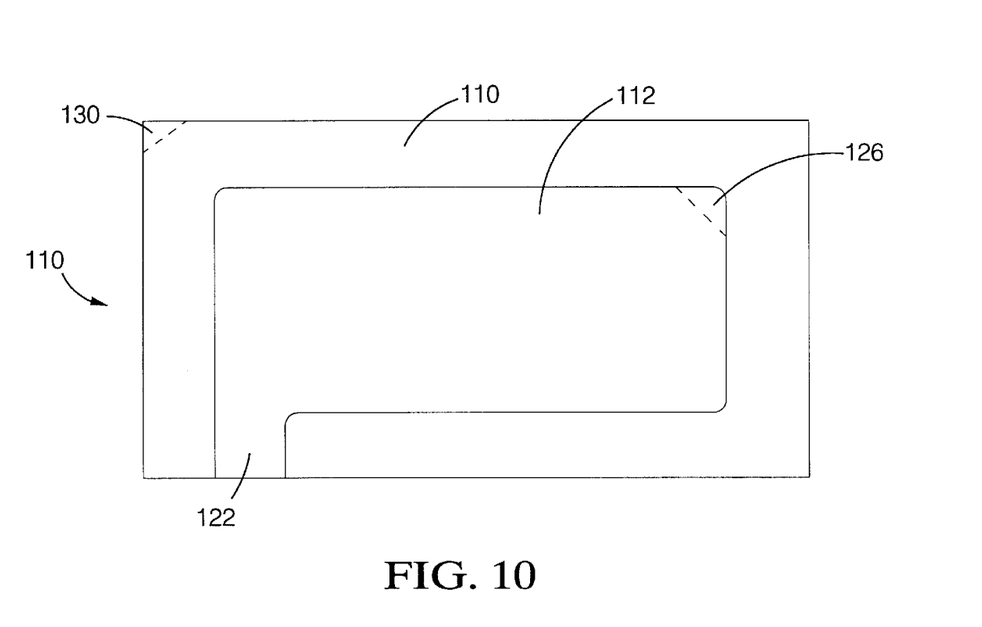
FIG. 10 is a view of a plate prepared as in FIG. 9 and rotated to an appropriate orientation for stacking to form the NTP element.

FIGS. 9 and 10 depict a preferred embodiment for the conductive print 112 disposed on the single structural dielectric barrier plate 110 of FIG. 8. Assembly of the multi-cell NTP reactor 100 preferably comprises, placing a first printed plate 110 with print side up onto a thick outer plate, such as cover plate 118, the conductive print 112 having a first orientation such as shown in FIG. 9. The outer plate 118 provides electrical isolation and imparts additional strength to the assembled stack. Assembly further comprising disposing dielectric spacers 114 along each side of the printed plate 110, thereby forming exhaust passages 116 of the desired dimensions. Assembly further comprises disposing a second printed plate 110 onto the growing stack, rotating the second plate 180 degrees with respect to the first plate. Only one print pattern is required, as the single pattern may be rotated to provide power or ground orientation for each layer. FIG. 10 provides a view of a printed plate 110 prepared as in FIG. 9 and rotated to an appropriate orientation for stacking to form the NTP element 100.

In a preferred embodiment, an unprinted cut-out region 126 is provided about 180 degrees from the terminal location 122 or 124 so as to reduce the potential for voltage leakage between cells during operation of the reactor. In another preferred embodiment, the print pattern 112 includes rounded corners 128 provided to avoid voltage accumulation.

In another preferred embodiment, an orientation feature, such as a truncated corner 130, is provided to align successive layers thus providing error-proof assembly. Additional ease of assembly is provided by locating the terminal strip 122, 124 near the front and rear corners of the reactor element 100 and extending to the side or to the front, thus enabling the electrical connections to be made in areas providing the most space for electrical isolation and ease of connection. When assembled, spacers 114 cover terminal strip 122, 124.

Assembly continues by adding an additional row of spacers 114 and a third printed plate (not shown), again rotated 180 degrees from the second printed plate. Assembly continues by proving the spacers-conductive printed plate series for each cell in the planar NTP reactor element.

Electrical connections are provided, typically by placing braided electrical connection leads between the last power-side terminal and spacer (or outside plate) and the last ground side terminal and spacer (or outside plate) to serve as electrical connections to power and ground. The thick outer cover plate on the ground side of the stack further provides electrical isolation and additional strength to the reactor.

The reactor is secured, typically by placing a dielectric adhesive at desired locations, such as at several locations along the sides of the reactor element or between layers of stacked plates. Conductive bus strips are attached along each side of the reactor element to join positive terminals together on one side and ground terminal together on the other side. The reactor is then wrapped in a matt, such as an intumescent matt, and stuffed into a housing or placed into a housing half-shell. Electrical connections are providing such as by spot welding the braided round wire to the housing and welding the power braided wire to a high voltage feed-through.

The conductive print 112 may be disposed in any pattern desired, including solid or partial print coverage. In a preferred embodiment, a partial print pattern is provided in order to reduce conductive ink cost while providing increased power per unit area capability. The partial print pattern may comprise, for example, a conductive print defining a near uniform distribution of holes within a conductive print matrix.

Figure 11:
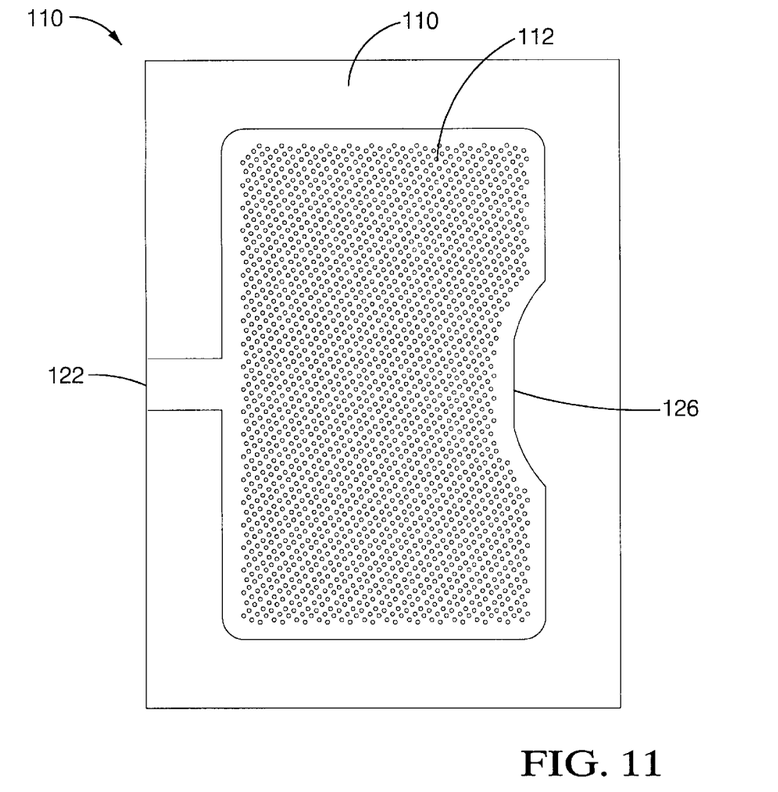
FIG. 11 is a view of a preferred conductive print pattern defining a distribution of unprinted areas defining holes and an unprinted area defining a non-conductive cut-out region for preventing voltage leaks.

FIG. 11 depicts printed plate 110 having a preferred continuous grid conductive print pattern 112 defining a distribution of conductive material defining unprinted holes and an unprinted cutout region 126 for preventing voltage leaks. Terminal 122 is provided at a preferred terminal location 122 disposed 180 degrees from the optional unprinted cutout region 126 to prevent the possibility of voltage leaks. This mid-point terminal location is particularly advantageously employed when electrical connections are provided through the sides of the reactor housing.

Figure 12:
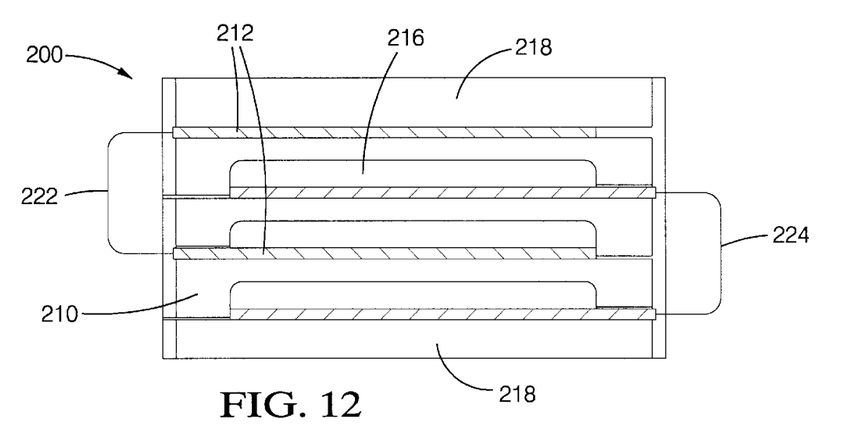
FIG. 12 is a view of a multi-cell single structural dielectric barrier NTP reactor element prepared from C-shaped single dielectric barriers having conductive material disposed on "back" surface of C-shaped barriers.

FIG. 12 depicts a multi-cell NTP reactor element 200 comprising C-shaped (or "half-box" shaped) single dielectric barriers 210 having conductive material 212 disposed onto the flat-side, or back, surface of the C-shaped single dielectric barrier 210. In this embodiment, a first planar outside cover plate 218 is provided having a conductive material printed thereon (such as the coated planar plate 110 of FIG. 9), having a power side up orientation. A conductive printed C-shaped single dielectric barrier 212, oriented ground side up, is disposed upon the first planar plate 218, to form a first cell having exhaust passage 216.

Additional cells are formed by placing additional conductive printed C-shaped single dielectric barriers 212 onto the growing stack, with the terminal side orientation alternating between power side 224 and ground side 222 at each successive layer. The stack is capped with a thick unprinted outer dielectric plate 218, which provides additional mechanical strength and electrical isolation to the element 200.

The layers are secured, electrical connections provided, and assembly accomplished, using any suitable method, such as in the manner described with respect to the embodiment of FIG. 8.

FIGS. 13 through 16 depict various features of a single cell cylindrical reactor element 300 prepared including a large diameter dielectric tube 310 and a structural metallic outer tube 311. Large diameter dielectric tube 310 may be any suitable diameter for the intended system. Typical dimensions for the large diameter dielectric tube 310 lie in the range of about 12 centimeters to about 25 centimeters in diameter and about 10 centimeters to about 30 centimeters in length.

Figure 13:
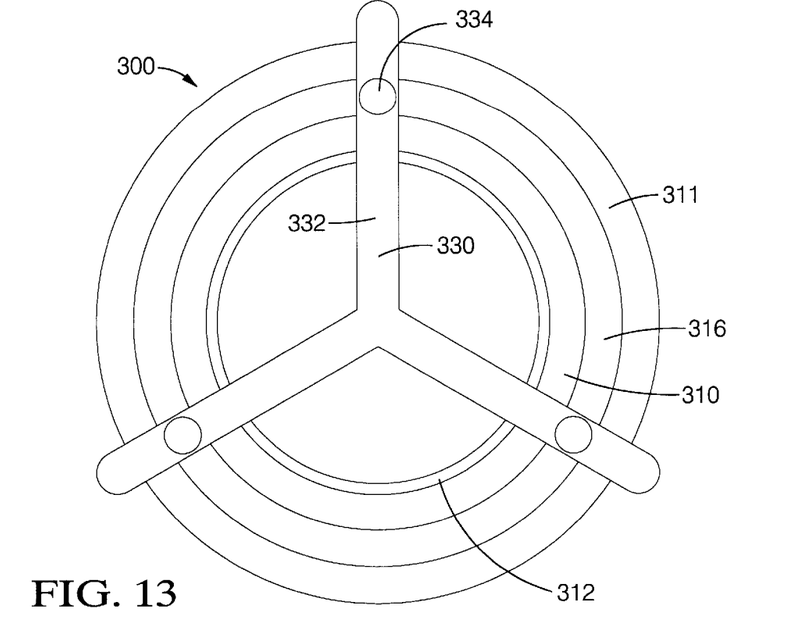
FIG. 13 is a view of a single cell cylindrical NTP reactor element prepared with a dielectric barrier tube.

In the embodiment of FIG. 13, the large diameter dielectric tube 310 is coated on the interior surfaces with a conductive material 312. A shielded wire (not shown) is attached to the inside of the dielectric tube 310 for providing electrical connections. The cell is secured using a securing device.

Figure 16:
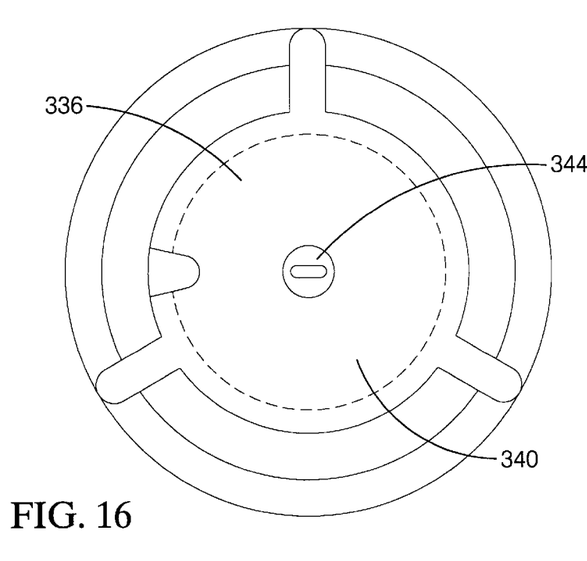
FIG. 16 is a view showing the rear locator-end supports of the cylindrical reactor of FIG. 14.

Preferably, the securing device comprises a ceramic spider 330 arrangement comprises a front centerpiece 332, three ceramic tubes 334, and a back centerpiece 336 (back centerpiece 336 shown in FIG. 16).

The spider securing device 330 covers the interior of the coated dielectric tube 310, blocking exhaust flow therethrough, thus limiting exhaust flow to exhaust passages 316. A cable pass through is provided for extending a power cable from the inside of the dielectric tube 310 through the pass through. The dielectric tube 310 is placed over the front centerpiece 332 and held in place using the three dielectric tubes 334 inserted through openings provided therefor in the front centerpiece 332. The conductive metal tube 311 is inserted over the dielectric tube 310 to form the ground electrode. The conductive metal tube 311 is typically a metal alloy, such as, but not limited to, copper, aluminum, or stainless steel. A braided wire is welded to the conductive metal tube 311 for eventual welding to the reactor housing. The back centerpiece 336 slides over the three dielectric tubes 334 and is compressed against the dielectric tube 310 and conductor tube 311 securing the cell. The reactor components are further secured using any suitable means, such as with adhesive. The front and back centerpieces 332, 336 have an intumescent ceramic layer (not shown) on the surface adjacent the dielectric tube 310 and conductor tube 311 faces to provide cushioning and compensation for thermal coefficient of expansion mismatch between the dielectric tube 310 and conductor tube 311. Electrical connections are completed, and assembly accomplished, using any suitable method, such as in the manner described with respect to the embodiment of FIG. 8.

Figure 14:
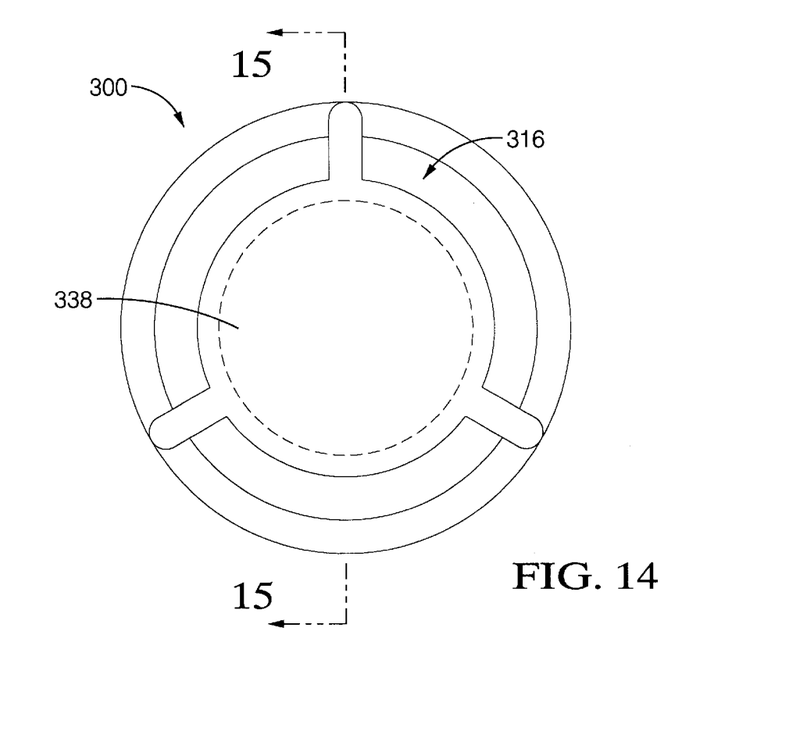
FIG. 14 is a view showing one embodiment of the present method for preparing cylindrical reactors with end supports thereby eliminating performance limiting ligaments within the active area of the NTP reactor.
Figure 15:
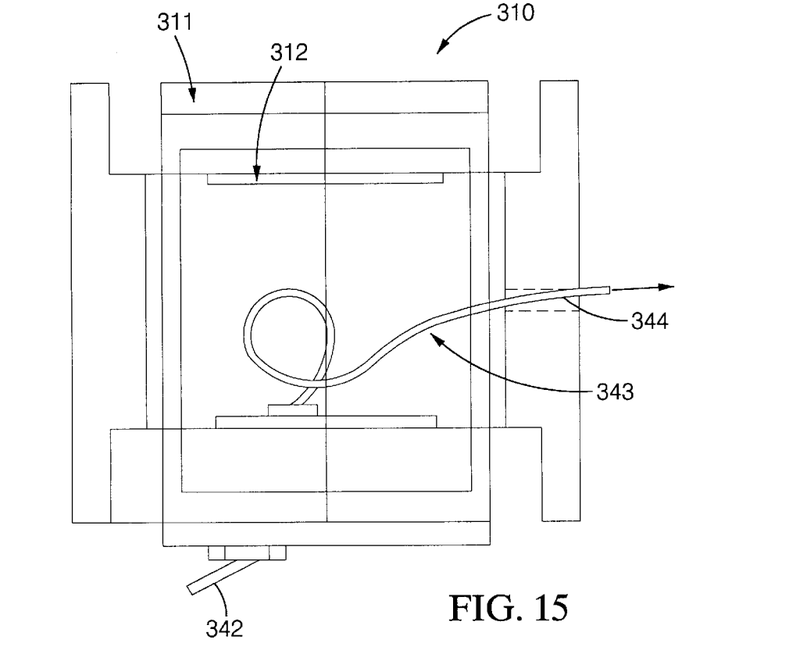
FIG. 15 is a sectional view taken along the line 15—15 of FIG. 14, showing additional detail of the method of FIG. 14.

FIGS. 14, 15, and 16 show an alternate mounting scheme for preparing a cylindrical NTP reactor 300 having end supports 338, 340 that eliminate the requirement for ligaments within the plasma region (exhaust passages) 316 of the reactor. In accordance with the method of this embodiment, the step of connecting ligaments within the active area of the plasma reactor is eliminated, providing enhanced conversion efficiency. FIG. 15 provides a sectional view taken along the line 15—15 of FIG. 14, showing additional detail of the method of FIG. 14. FIG. 16 provides a view showing the rear locator-end supports 340 of the cylindrical reactor 300 of FIG. 14.

The method comprises providing a large dielectric tube 310 coated on the inside surfaces thereof, leaving a certain amount of surfaces uncoated on each end. For example, a large dielectric tube may be coated on inside surfaces to within about 5 to about 20 millimeters from the ends. A braided ground cable 342 is attached, such as by welding or brazing, etc., to the outside of conductive tube 311. The braided cable 342 is eventually welded to the housing and connected to ground. A shielded power cable 343 is attached to the conductive coating 312 on the inside of dielectric tube 310 using welding or brazing.

The coated dielectric tube 310—power cable 343 assembly is pressed onto the front plug/locator/support member 338. The conductive tube 311—ground cable 343 assembly is inserted over the conductive-coated tube 310—power cable 343 assembly and onto the front plug/locator/support 338 and attached using any suitable method, such as adhesive bonding, partially extending dowels, built-in channels in the rear/locator/support, ceramic mat, or other known securing methods.

The rear locator/support 340 (shown in FIG. 16) does not need to plug the inside of the tube 310 since untreated exhaust flow is prevented by the front plug/locator/support 338. A pass through 344 is provided for the power cable 343, which pass through 344 may comprise a hole or cutback region defined in the locator/support 340.

The power cable 343 is passed through the rear locator/support 340 and locator/support 340 is pressed into the coated dielectric tube 310 and against conductive tube 311, using adhesive, partially extending dowels, built-in channels in the rear/locator/support, ceramic mat, or other known securing methods. Optionally, front plug/locator/support member 338 and rear locator/support member 340 may be secured together against coated dielectric tube 310 and conductive tube 311 using a mechanical stake that seals against the front and rear supports 338, 340. The stake may be spring loaded to provide near constant pressure while accommodating thermal expansion.

Front plug/locator/support 338, and to a lesser extent back locator/support 340, may be modified to reduce backpressure of the cylindrical NTPR reactor 300 if desirable. For example, reduction in back pressure can be accomplished by shaping plug/locator/support 338 with a cone tip facing the exhaust flow or by attaching a cone (not shown) to a flat face front plug/locator/support 338 as shown in FIG. 15.

Reactor assembly is completed with wrapping using dielectric mat, stuffing the reactor into the housing, and providing electrical connections, etc.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A single structural dielectric barrier non-thermal plasma reactor element comprising:
    an element having at least one cell comprising a conductor forming an electrode and terminal connector, said conductor comprising a conductive coating disposed in a print pattern on a single structural dielectric barrier; and
    an exhaust passage for flowing gas therethrough, so that during reactor operation, a non-thermal plasma is formed in said exhaust passage for treating gas as it passes through said exhaust passage;
    wherein individual cells of said element comprise a conductor-single structural dielectric barrier-exhaust passage-conductor arrangement.

2. The element of claim 1, wherein said cells comprise shapes selected from the group consisting of planar shapes, cylindrical shapes, swept shapes, plates, half-box shapes, C-shapes, and tube shapes.

3. The element of claim 1, further comprising:
    spacers selectively disposed so as to determine exhaust passage height in planar cells.

4. The element of claim 1, said conductor having a cut-out region disposed opposite said terminal connector for reducing potential voltage leaks.

5. The element of claim 1, wherein said conductive print pattern is selected from the group consisting of a solid pattern, a grid pattern, a partial print pattern, and combinations thereof.

6. The element of claim 1, wherein said conductive coating comprises a continuous grid pattern forming an electrode and terminal connector and having a cut-out region disposed opposite said terminal connector for reducing potential voltage leaks.

7. The element of claim 1, further comprising:

end supports enabling said exhaust passages to comprise ligament-free exhaust passages.

8. The element of claim 1, further comprising a cylindrical reactor element comprising:

a large diameter dielectric tube having a conductor comprising conductive material disposed on interior surfaces of said dielectric tube and an uncoated surface section at each end of said dielectric tube;

a structural conductive outer tube inserted over said dielectric tube, forming a ground electrode;

electrical connections from outside to inside of said dielectric tube; and a device for securing said large diameter dielectric tube and said structural conductive metal tube.

9. The element of claim 8, wherein said securing device comprises a front centerpiece disposed at a front end of said cylindrical element, said front centerpiece having openings for receiving a plurality of connecting members;

a back centerpiece disposed at a back end of said cylindrical element, said back centerpiece having openings for receiving a plurality of connecting members;

a plurality of connecting members connecting said cylindrical element to said front and back centerpieces;

wherein said securing device covers interior portions of said conductive coated dielectric tube providing ligament-free blocking of exhaust flow in desired regions.

10. The element of claim 9, wherein said front and back centerpieces have an intumescent ceramic layer on surfaces adjacent said dielectric tube and said conductor tube, thereby providing cushioning and compensation for thermal coefficient of expansion mismatch between said dielectric tube and said conductor tube.

11. The element of claim 8, wherein said large diameter dielectric tube comprises a diameter in the range of about 12 centimeters to about 25 centimeters and a length of about 10 centimeters to about 30 centimeters.

12. The element of claim 8, wherein said securing device comprises a shape suitable to effect reduced backpressure of said cylindrical reactor during operation.

13. The element of claim 12, wherein said securing device comprises a cone tipped shape.

14. The element of claim 1, wherein a single conductive print pattern is employed to form said conductor, said single pattern being oriented to provide a power orientation or a ground orientation to alternating reactor layers.

15. The element of claim 1, further comprising:

an orientation feature, to provide ease of alignment during reactor assembly.

16. The element of claim 15, wherein said orientation feature comprises a truncated corner.

* * * * *